(12) United States Patent
Barnhoefer et al.

(10) Patent No.: US 8,866,791 B2
(45) Date of Patent: Oct. 21, 2014

(54) PORTABLE ELECTRONIC DEVICE HAVING MODE DEPENDENT USER INPUT CONTROLS

(75) Inventors: Ulrich Barnhoefer, Cupertino, CA (US); Brett Gregory Alten, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 12/842,909

(22) Filed: Jul. 23, 2010

(65) Prior Publication Data

US 2011/0163976 A1  Jul. 7, 2011

Related U.S. Application Data

(60) Provisional application No. 61/292,772, filed on Jan. 6, 2010.

(51) Int. Cl.
*G06F 3/045* (2006.01)
*G09G 5/00* (2006.01)
*G06F 3/041* (2006.01)
*G06F 1/32* (2006.01)

(52) U.S. Cl.
CPC ............ *G06F 1/3203* (2013.01); *G06F 1/3262* (2013.01); *Y02B 60/1289* (2013.01); *G06F 1/3231* (2013.01); *G09G 2380/14* (2013.01)
USPC ............................ 345/174; 345/173; 345/156

(58) Field of Classification Search
USPC .................................. 345/156–158, 173–177
See application file for complete search history.

(56) References Cited

U.S. PATENT DOCUMENTS

| 7,248,248 | B2 * | 7/2007 | Lampson | 345/173 |
|---|---|---|---|---|
| 7,495,659 | B2 | 2/2009 | Marriott | |
| 2006/0032680 | A1 | 2/2006 | Elias | |
| 2006/0161871 | A1 * | 7/2006 | Hotelling et al. | 715/863 |
| 2008/0072163 | A1 * | 3/2008 | Teng et al. | 715/761 |
| 2009/0066665 | A1 * | 3/2009 | Lee | 345/173 |
| 2009/0219248 | A1 | 9/2009 | Li | |
| 2010/0026660 | A1 * | 2/2010 | Kitamura | 345/174 |

FOREIGN PATENT DOCUMENTS

WO  2008033876  3/2008

* cited by examiner

*Primary Examiner* — Kenneth Bukowski
(74) *Attorney, Agent, or Firm* — Kendall P. Woodruff

(57) ABSTRACT

Improved approaches to provide user interaction with a portable electronic device operating to in a particular mode, such as an e-reader mode, are disclosed. In one embodiment, the portable electronic device is a multi-function portable electronic device that can be configured differently based on a particular mode being used. Based on the mode of operation or application being used, the user inputs to the device can be characterized differently. Advantageously, with mode-based configurations, the portable electronic device can operate to make use of user interface controls in an efficient manner. The mode-based configuration can save power, increase efficiency, and/or speed up operation of the device.

9 Claims, 5 Drawing Sheets

PORTABLE ELECTRONIC DEVICE HAVING MODE DEPENDENT USER INPUT CONTROLS

CROSS-REFERENCE TO OTHER APPLICATION

This claims priority to U.S. Provisional Patent Application No. 61/292,772, filed Jan. 6, 2010, entitled "PORTABLE ELECTRONIC DEVICE HAVING MODE DEPENDENT USER INPUT CONTROLS", which is hereby incorporated herein by reference.

BACKGROUND OF THE INVENTION

Portable computers, such as notebook computers, are multi-purpose devices that are controlled by software and users to perform desired functions. Given the breath of functions and capabilities supported by portable computers, they are not usually optimized for performing any one function. On the other hand, dedicated, limited purpose devices can be optimized for performance of a particular limited purpose. One example of a limited purpose device is an e-reader (or e-book reader). The e-reader can be relatively power efficient through use of e-ink display technology. Hence, traditionally, there is a tradeoff between multi-functionality and low power consumption.

SUMMARY

Improved ways to provide user interaction with a portable electronic device operating in a particular mode, such as an e-reader mode, are disclosed. In one embodiment, the portable electronic device is a multi-function portable electronic device that can be configured differently based on a particular mode being used. Based on the mode of operation or application being used, user inputs to the device can be characterized differently. Advantageously, with mode-based configurations, the portable electronic device can operate to make use of user interface controls in an efficient manner. The mode-based configuration can save power, increase efficiency, and/or speed up operation of the portable electronic device.

Embodiments of the invention can be implemented in numerous ways, including as a method, system, device, apparatus (including computer readable medium and graphical user interface). Several embodiments of the invention are discussed below.

As a method for controlling a portable electronic device, one embodiment can, for example, determine whether the portable electronic device is in an e-reader mode, and configure the portable electronic device in accordance with the e-reader mode when it is determined that the portable electronic device is in the e-reader mode. The method can also receive a user interface input and characterize the user interface input as a user request with respect to the e-reader mode. The characterization can be performed differently for different modes of the portable electronic device. The method can further determine whether an action at the portable electronic device is to be initiated based on the user request, and initiate the action denoted by the user request if it is determined that the action at the portable electronic device is to be initiated.

A method for controlling a portable electronic device having a touchscreen and at least one proximity sensor. In one embodiment, the portable electronic device determines if it is in an e-reader mode. If it is, the device can be configured in accordance with the e-reader mode. The configuration process can include, for example, deactivating the touchscreen. The control method can also determine whether a proximity sensor input is received from one or more proximity sensors. At least a portion of the touchscreen can be activated if it is determined that the proximity sensor input is received. In addition, the control method can determine whether a touch input is received via the touchscreen and characterize the input as a type of user request in the e-reader mode. In one embodiment, the method can also determine whether an action at the portable electronic device is to be initiated based on the user request, and initiate the action denoted by the user request if it is determined that the action at the portable electronic device is to be initiated.

As a portable electronic device, one embodiment can, for example, include at least: a display, a user input device configured to receive a user input, a configuration manager to configure the portable electronic device in an e-reader mode or at least one other mode, and a processor. The processor can be configured to execute instructions that operate to evaluate the user input that has been received in accordance with the e-reader mode if determined that the portable electronic device is in the e-reader mode. Alternatively or additionally, the processor can be configured to evaluate the user input that has been received in accordance with the at least one other mode if determined that the portable electronic device is not in the e-reader mode.

As a method for controlling a portable electronic device, one embodiment can, for example, detect a user input at the portable electronic device, and determine whether the portable electronic device is in an e-reader mode. The user input that has been detected can be evaluated in accordance with the e-reader mode if the portable electronic device is in the e-reader mode, can be evaluated in accordance with another mode if the portable electronic device is not in the e-reader mode.

As a computer readable storage medium including at least computer program code stored therein for controlling an electronic device, one embodiment can, for example, include computer program code for configuring the electronic device in accordance with the e-reader mode, computer program code for receiving a user interface input, and computer program code for characterizing the user interface input as a user request with respect to the e-reader mode if the electronic device is configured in accordance with the e-reader mode. The computer readable medium can also include computer program code for determining whether an action at the electronic device is to be initiated based on the user request, and computer program code for initiating the action denoted by the user request if it is determined that the action at the electronic device is to be initiated.

As a method for controlling a portable electronic device, one embodiment can, for example, present an e-book on a display device associated with the portable electronic device. The method can also receive an accelerometer or force sensor input imposed on the portable electronic device. Still further, the method can also determine a user request for user control of the presentation of the e-book based on the accelerometer or force sensor input, and then initiate processing at the portable electronic device in response to the user request.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF EMBODIMENTS OF THE INVENTION

Improved ways to provide user interaction with a portable electronic device operating in a particular mode, such as an e-reader mode, are disclosed. In one embodiment, the portable electronic device is a multi-function portable electronic device that can be configured differently based on a particular mode being used. Based on the mode of operation or application being used, user inputs to the device can be characterized differently. Advantageously, with mode-based configurations, the portable electronic device can operate to make use of user interface controls in an efficient manner. The mode-based configuration can save power, increase efficiency, and/or speed up operation of the portable electronic device.

Exemplary embodiments of the invention are discussed below with reference to FIGS. 1-5. However, those skilled in the art will readily appreciate that the detailed description given herein with respect to these figures is for explanatory purposes as the invention extends beyond these limited embodiments.

Figure 1:
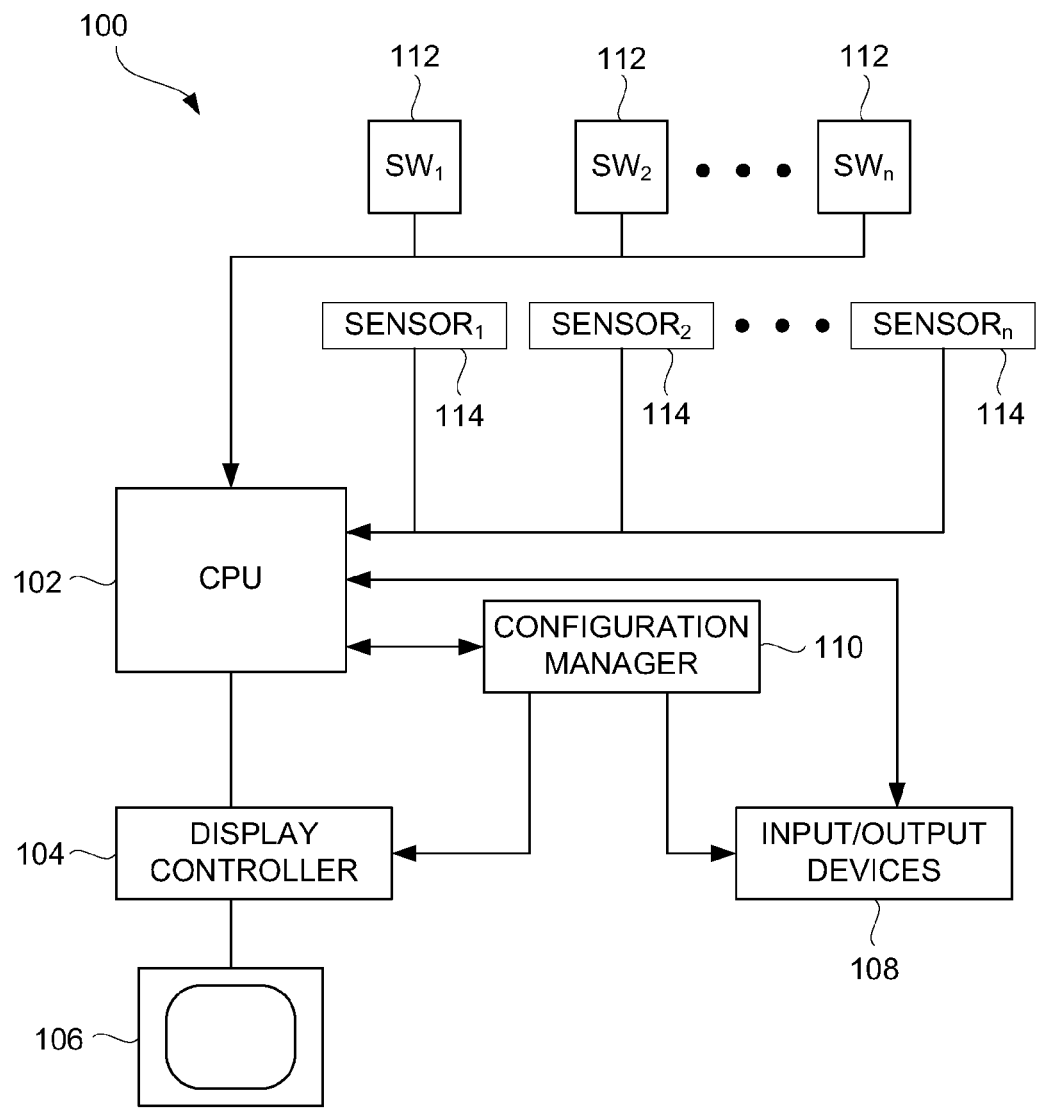
FIG. 1 is a block diagram of portable electronic device according to one embodiment.

FIG. 1 is a block diagram of portable electronic device 100 according to one embodiment. Portable electronic device 100 can include central processing unit (CPU) 102. CPU 102 can control overall operation of portable electronic device 100. Device 100 can also include other electrical components such as, for example, display controller 104, display device 106, and one or more input/output devices 108. Display controller 104 can be coupled to and controlled by CPU 102. Display controller 104 can provide specialized display related processing and/or signal generation so as to produce signals that cause text and graphics to be presented on display device 106. In one embodiment, display controller 104 can be, can include or can couple to a graphical processing unit (GPU). Display device 106 can be a monitor for providing visual output. Additionally, display device 106 can be touch and/or optically sensitive—that is, it can be configured to receive touch and/or optical inputs. One or more input/output devices 108 can also be coupled to and controlled by CPU 102. Examples of input/output devices 108 can vary widely but can, for example, be chosen from at least the group consisting of keyboards, track pads, touch surfaces (e.g., touchscreen, touchpad, etc.), network interfaces, wireless receivers/transmitters, data storage devices, etc.

Portable electronic device 100 can also include configuration manager 110. CPU 102 and/or configuration manager 110 and/or other components can determine whether portable electronic device 100 is operating in an e-reader mode. For example, if portable electronic device 100 is presently operating an e-book application program, portable electronic device 100 can be considered in an e-reader mode. Configuration manager 110 can be implemented as hardware, firmware or software, depending on the overall architecture and requirements of the device.

If configuration manager 110 is aware that the portable electronic device 100 is operating in an e-reader mode, configuration manager 110 can operate to configure one more electronic components (that is, change one or more operational parameters to optimize or otherwise modify the performance of the device in a particular operational mode). In FIG. 1, for example, it is assumed that portable electronic device 100 is operational in one of at least two modes. A first mode is referred to as a default (or normal) mode, and a second node is referred to as an e-reader mode. More specifically, if portable electronic device 100 is operating in an e-reader mode, configuration manager 110 can configure the one or more electrical components of portable electronic device 100 for the e-reader mode. On the other hand, when configuration manager 110 understands that portable electronic device 100 is not operating in an e-reader mode, configuration manager 110 configures the one or more electrical components of portable electronic device 100 for the default mode. As compared to the default mode, e-reader mode can offer reduced power consumption operation of portable electronic device 100, or can maximize readability, or both, depending on user preferences or environmental, ambient, and/or orientational sensing. More generally, to improve readability and/or low power operation for a given mode, characteristics of a display, its control over displaying content, and content being displayed can be enhanced for a given mode of operation. For example, with respect to a display, setting can pertains to font, font size, brightness, contrast, alignment, and/or orientation. Depending on the functionality of portable electronic device 100, configuration manager 110 can support two or more modes of operation. The configuration provided by configuration manager 110 for the various modes can be defined by a respective mode profile, which may be automatic or user-selected.

CPU 102 can perform processing to determine whether portable electronic device 100 is being used in an e-reader mode. For example, in one embodiment, CPU 102 can evaluate whether an e-reader application is active and in use on portable electronic device 100. In one embodiment, computer code executed by the CPU 102 can determine whether an e-reader application is active and in use (e.g., active application program on portable electronic device 100). In one embodiment, an operational mode monitor (e.g., e-reader monitor) can be provided to assist CPU 102 in determining an operational mode of the portable electronic device. Additional information concerning a mode monitor and mode-based configuration can be found in U.S. Provisional Patent Application No. 61/292,777, filed Jan. 6, 2010, and entitled "MODE DEPENDENT CONFIGURATION OF PORTABLE ELECTRONIC DEVICE," which is hereby incorporated herein by reference in its entirety.

Portable electronic device 100 can also include one or more switches 112 and/or one or more sensors 114. Switches 112 can be coupled to CPU 102, and sensors 114 can also be coupled to CPU 102. Hence, CPU 102 can monitor these switches 112 and sensors 114 for inputs to portable electronic device 100. For example, switches 112 can correspond to buttons, keys, optical switches, etc. Also, for example, sensors 114 can correspond to motion sensors (e.g., accelerometers), force sensors, optical sensors (e.g., cameras), capacitive and/or resistive touch sensors, radiation sensors, orientation sensors, etc. The availability and usage of switches 112 and/or sensors 114 can be dependent on the mode of operation of portable electronic device 100. Switches 112 and/or sensors 114 can also be used to influence the configuration of the one or more electrical components by configuration manager 110.

Figure 2:
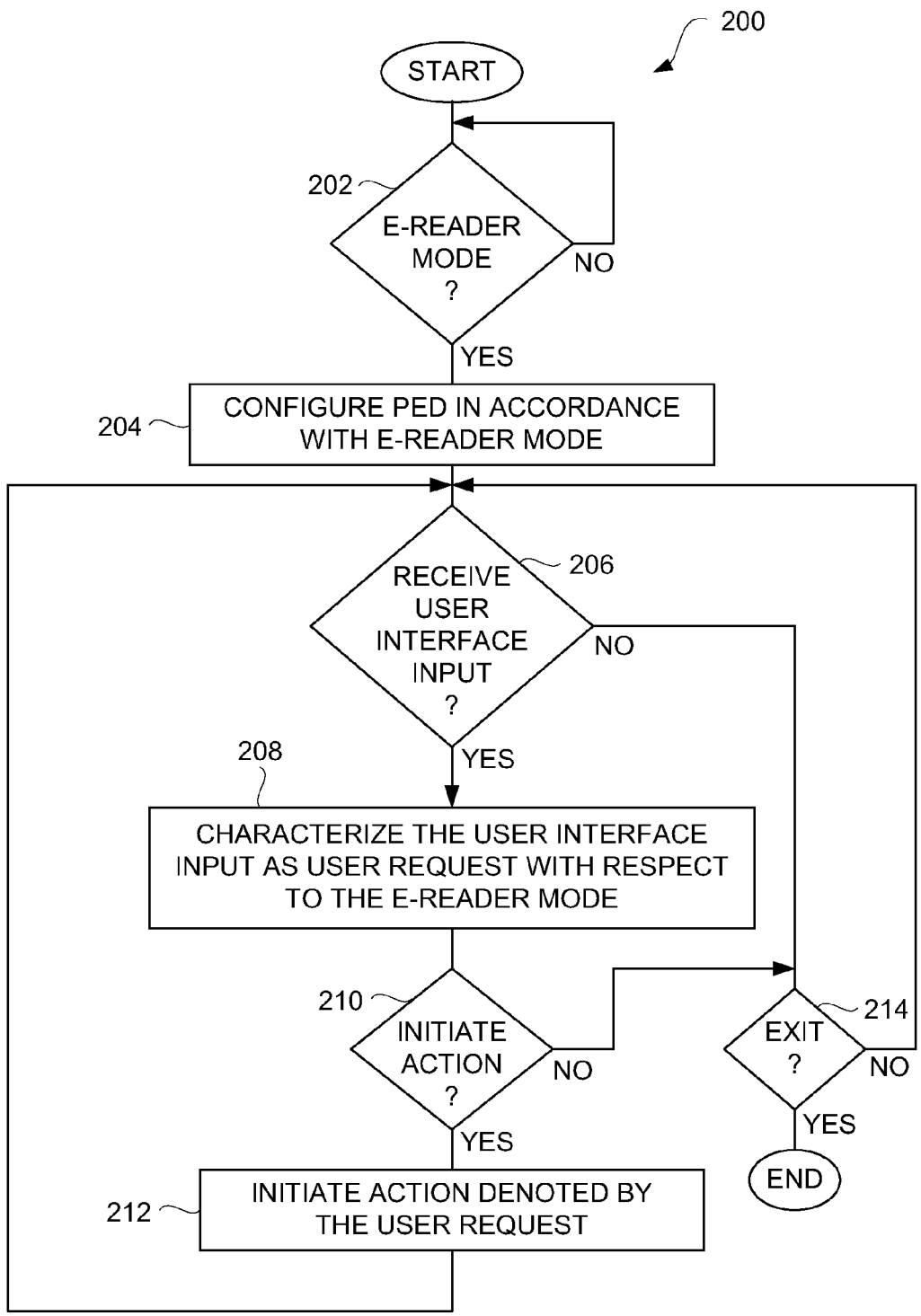
FIG. 2 is a flow diagram of an e-reader control process according to one embodiment of the invention.

FIG. 2 is a flow diagram of E-reader control process 200 according to one embodiment of the invention. E-reader control process 200 can, for example, be performed by a portable electronic device, such as the portable electronic device illustrated in FIG. 1.

E-reader control process 200 can begin with decision 202 that determines whether the portable electronic device is in an e-reader mode. When decision 202 determines that the portable electronic device is not in an e-reader mode, e-reader control process 200 is not perform. Here, it should be noted that e-reader control process 200 is effectively performed when the portable electronic device is in the e-reader mode.

Accordingly, once decision 202 determines that the portable electronic device is in an e-reader mode, the portable electronic device can be configured 204 in accordance with the e-reader mode. Typically, the portable electronic device is a multi-function device, so the ability to place the portable electronic device in a particular operational mode allows the device to operate efficiently and differently in its various modes. For example, as explained herein, in an e-reader mode certain hardware can be disabled or used differently or less often to operate in a particular manner (e.g., to operate in a more power efficient manner), but in another mode (such as a media playback mode) the certain hardware may be enabled and used to provide adequate playback performance.

For example, with respect to portable electronic device 100, the configuration manager 110 (or elsewhere in portable electronic device) can provide storage for mode characteristics that are associated with the modes. For example, in the e-reader mode, the mode characteristics for the e-reader mode can be retrieved and made available to the e-reader control process 200 so that the portable electronic device can be configured. Additionally, it is possible that the portable electronic device can be use by multiple different users and, in such case, the mode characteristics can be dependent on the user. The mode characteristics for the one or more users can also be stored at the portable electronic device.

Next, decision 206 can determine whether a user interface input has been received. Here, the portable electronic device includes one or more user interface sensors and/or one or more user interface switches. Decision 206 determines whether a user input has been received from one or more of the user interface inputs. When decision 206 determines that user interface input has not been received, e-reader control process 200 can await such user input. On the other hand, when decision 206 determines that user interface input has been received, the user interface input can be characterized 208 as a user request with respect to the e-reader mode. In other words, the user interface input is used to signal the portable electronic device of an input by a user. Characterization 208 is used to characterize the user input to a specific user request with respect to the e-reader mode. The user input can be characterized 208 differently in different operational modes.

Next, decision 210 determines whether the user request that results from characterization 208 requests that an action be initiated. When decision 210 determines that an action is to be initiated, action denoted by the user request can be initiated 212. Following initiating 212, e-reader control process 200 can return to repeat decision 206 so that subsequent user interface inputs can be similarly processed.

On the other hand, when decision 210 determines that there is no action being denoted by the user request, decision 214 can determine whether e-reader control process 200 should exit (i.e., end). When decision 214 determines that e-reader control process 200 should not exit, e-reader control process 200 can return to repeat decision 206. Additionally, it should be noted that when decision 206 determines that user interface input has not been received, e-reader control process 200 can also proceed to decision 214.

Figure 3:
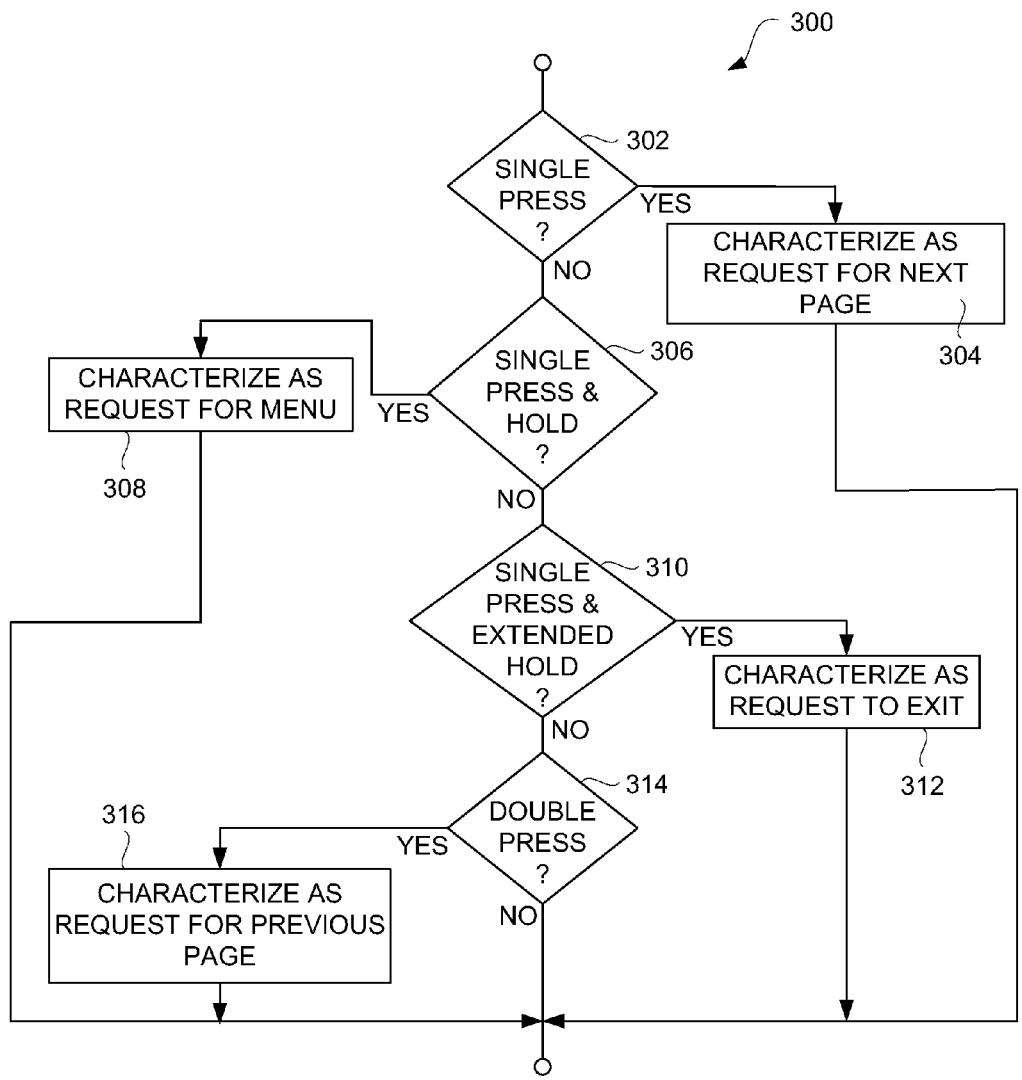
FIG. 3 is a flow diagram of a characterization process according to one embodiment.
Figure 4:
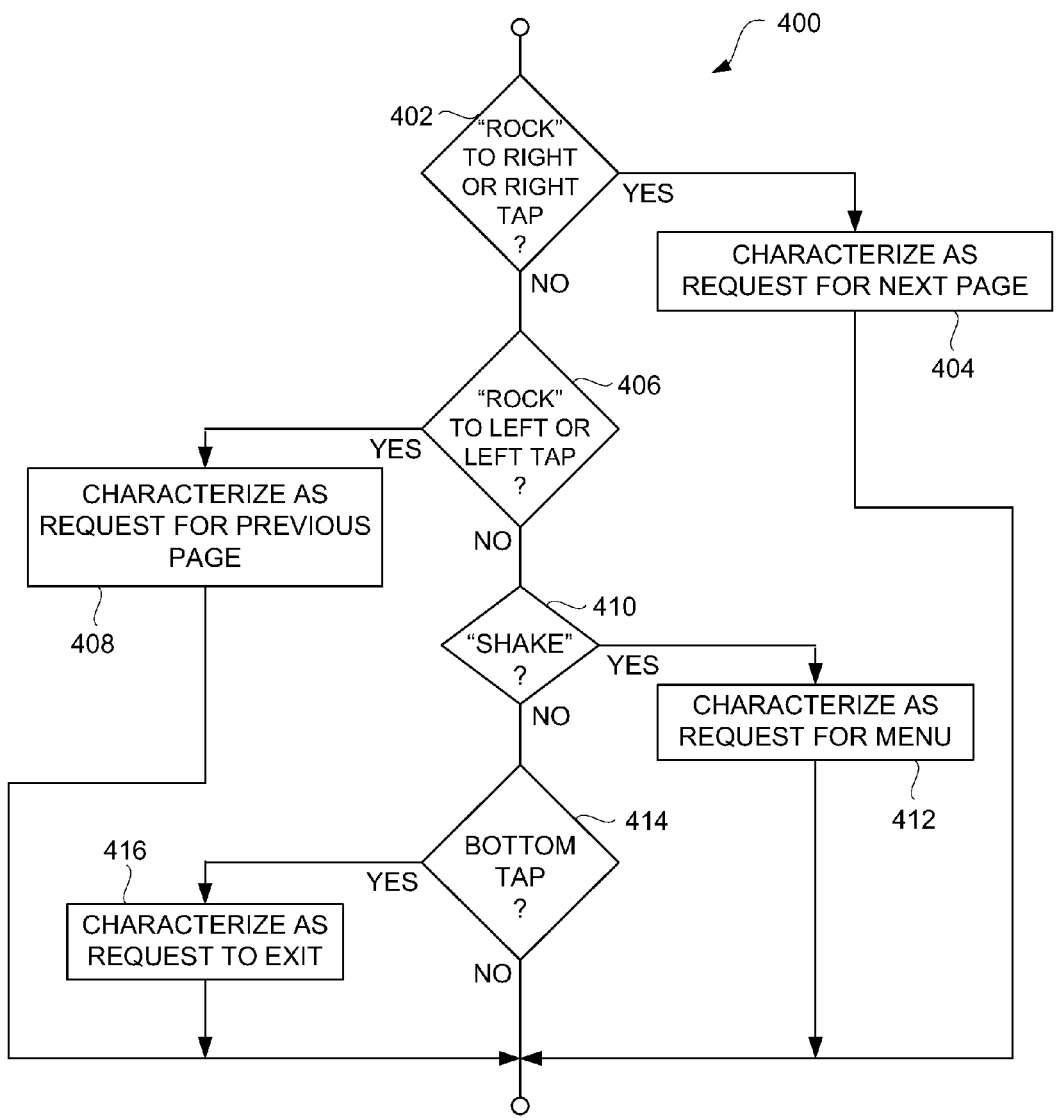
FIG. 4 is a flow diagram of a characterization process according to another embodiment.

Characterization 208 of user interface input to user requests with respect to operational mode, such as the e-reader mode, can be performed in a variety of different ways. FIGS. 3 and 4 discussed below indicate two embodiments of such characterization.

FIG. 3 is a flow diagram of characterization process 300 according to one embodiment. Characterization process 300 can, for example, pertain to characterization performed by block 208 illustrated in FIG. 2, according to one embodiment. In general, it should be noted that characterization process 300 operates in response to receiving user input, such as through a sensor or switch, at a portable electronic device. In the embodiment illustrated in FIG. 3, the user input is with respect to at least one user input device that can be pressed, such as button or key.

Characterization process 300 can begin with decision 302 that determines whether a single press (or tap) of the user input device has been received. When decision 302 determines that a single press of the user input device has been received, the user input can be characterized 304 as a request for a next page. Alternatively, when decision 302 determines that a single press of the user input device has not been received, decision 306 can determine whether a single press and hold of the user input device has been received. A press and hold involves pressing down the user input device and holding the user input device is the pressed downward position for at least a predetermined period of time. When decision 306 determines that a single press and hold of the user input device has been received, the user input can be characterized 308 as a request for a menu to be displayed. The menu can, for example, provide user selectable menu items that facilitate control of the e-reader mode or, more generally, the portable electronic device.

On the other hand, when decision 306 determines that a single press and hold of the user input device has not been received, decision 310 can determine whether a single press and extended hold of the user input device has been received. A press and extended hold involves pressing down the user input device and holding the user input device is the pressed downward position for at least a predetermined period of time, where the predetermined period of time is greater than that associated with a press and hold. When decision 310 determines that a single press and extended hold of the user input device has been received, the user input can be characterized 312 a request to exit presentation of a particular e-book or the e-reader mode.

Alternatively, when decision 310 determines that a single press and extended hold of the user input device has not been received, decision 314 can determine whether a double press of the user input device has been received. The double press can pertain to two successive presses of the use input device, including rapid successive presses such as a double tap. When decision 314 determines that a double press of the user input device has been received, the user input can be characterized 316 as a request for a previous page. On the other hand, when decision 314 determines a double press of the user input device has not been received, it can be assumed that the user input via the user input device was not recognized as any of a particular set of user inputs that are available with respect to the user input device in the e-reader mode. Following the characterization at blocks 304, 308, 312 and 316, characterization process 300 is complete as the user input has been successfully characterized as a known request (e.g., command) for interaction with respect to the portable electronic device operating in the e-reader mode.

It should be understood that in other embodiments, the characterization of the user input can be to different requests (e.g., commands) for operation of the portable electronic device. Typically, a request will correspond to an operation available in a given operational mode (e.g., e-reader mode) of the portable electronic device. The user input can be provided via a user input device and can take many different forms and need not be a button or key. The user input might be a key or button press (e.g., physical button or key), a touch, a gesture, a spoken utterance, etc. The nature of the user input device can also dictate the nature of the user input with respect to the user input device. The exemplary nature of the user input discussed in FIG. 3 pertains to press, hold and tap attributes. However, these attributes are merely exemplary. In another embodiment, the user input device can be a touch sensitive surface, and the attributes can pertain to pressure, acceleration, direction or rotation, and combinations thereof. With use of a touch sensitive surface, the user input can pertain to gestures. In a given mode of operation, a user input device can be configured to recognize a limited set of user inputs, which can facilitate more efficient recognition of such user inputs with less device resources.

In one embodiment, the user input device can be a button or key that also has a touch sensitive surface. For example, a button can have a top surface that can be touch sensitive. In such an embodiment, in addition to or alternative to being able to press the button to signal a user input, a user can also input a touch action (e.g., gesture) on the touch sensitive.

In another embodiment, in a particular mode (such as an e-reader mode), a key or button (e.g., physical key or button) can be used while any touch sensitive surface is deactivated in whole or in part. The key or button can be separate from the touch sensitive surface and can enable user inputs to be received. This can allow reduced power operation since the key or button operates with little or no power as compared to the touch sensitive surface. Although more than one key or button could be used, a single button can be used in a variety of ways to signal any of several distinct user inputs. These user inputs can cause different actions depending on the mode of operation.

FIG. 4 is a flow diagram of characterization process 400 according to one embodiment. Characterization process 400 can, for example, pertain to characterization performed by block 208 illustrated in FIG. 2, according to one embodiment. In general, it should be noted that characterization process 400 operates in response to receiving user input at a portable electronic device. In the embodiment illustrated in FIG. 4, the user input is provided through user manipulation of the portable electronic device itself. For example, the user manipulation to signal user input can involve a physical action applied to the portable electronic device, such as rocking, tapping or shaking, of the portable electronic device.

Characterization process 400 operates to characterize user inputs associated with movement of the portable electronic device. The characterization can be performed based on one or more attributes of the induced movement of the portable electronic device. Examples of some attributes include acceleration, orientation, direction, etc. Given that the portable electronic device is operating in the e-reader mode, the set of the understood movements can be constrained to a limited set of particular actions. More particularly, decision 402 can determine whether the user input is a "rock" to the right or a "right tap" with respect to the portable electronic device. A "rock" to the right refers to a rocking action in which the portable electronic device is turned or rotated to the right. A "right tap" can correspond to a tap action with respect to the right side of the portable electronic device. If decision 402 determines that there is a "rock" to the right or a "right tap", then the user input can be characterized 404 as a request for a next page. Alternatively, when decision 402 determines that the portable electronic device has not undergone a "rock" to the right or a "right tap", decision 406 can determine whether the user input is a "rock" to the left or a "left tap". A "rock" to the left refers to a rocking action in which the portable electronic device is turned or rotated to the left. A "left tap" can correspond to a tap action with respect to the left side of the portable electronic device. When decision 406 determines that the user input is a "rock" to the left or a "left tap", the user input can be characterized as a request for a previous page.

On the other hand, when decision 406 determines that the user input is not a "rock" to the left or a "left tap", then decision 410 can determine whether the user input corresponds to a "shake" of the portable electronic device. A "shake" refers to a rapid movement (e.g., back and forth movement) of the portable electronic device in various directions. When decision 410 determines that the user input corresponds to a "shake", then the user input can be characterized 412 as a request for a menu to be displayed. Alternatively, when decision 410 determines that the user input does not correspond to a "shake", decision 414 can determine whether the user input corresponds to a "bottom tap". A "bottom tap" can correspond to a tap action with respect to the bottom side of the portable electronic device. When decision 414 determines that the user input corresponds to a bottom tap, the user input can be characterized 416 as a request to end presentation of an e-book being displayed or to end the e-reader mode.

Alternatively, when decision 414 determines that the user input does not correspond to a "bottom tap", the user input is not characterized. In any event, following blocks 404, 408, 412 and 416, characterization process 400 can complete with user input having been characterized to one of a set of predetermined user actions designating a particular user request with respect to an e-reader mode of operation.

It should be understood that in other embodiments, the characterization of the user input can be to different requests (e.g., commands) for operation of the portable electronic device. Typically, a request will correspond to an operation available in a given operational mode (e.g., e-reader mode) of the portable electronic device. The user input with respect to movements of the portable electronic device are not limited to the examples in FIG. 4 pertaining to "rock", "shake" or tap. The size and configuration of the portable electronic device can also dictate the nature of the movements that might be suitable for signaling user requests. The user input is also not limited to movement of the portable electronic device.

As another embodiment, the user input could be evaluated for other specific types of input that can be characterized as particular user requests. For example, a "tilt" forward or backward is a type of user input that could be characterized as a specific user request, such as a request for next/previous page or next/previous chapter. As another example, a "quick rock" is a type of user input that could be characterized as a specific user request, and a "slow rock" is a type of user input that could be characterized as a specific user request. Here, besides the "rock" user input, the user input can have a time attribute associated with it (e.g., slow, quick). For example, a "tilt" forward and hold (in the tilted position for a predetermined time) can be characterized differently that a "tilt" forward without any significant hold. Hence, in one embodiment, the user input can be evaluated with respect to attributes such as direction, time, force, pressure, acceleration, etc. when characterizing user inputs as user requests. The user inputs can use any combination of movement and/or attributes to indicate to a device a requested action.

Also, in one some embodiment, the evaluation and/or characterization of user inputs can be done with different references in different situations or for different users. For example, "tap," "rock," "shake" and "tilt" can be evaluated with different sensitivity based on user or usage environment. That is, these user inputs are evaluated differently for different users and/or in different usage environments. In one example, a first user might prefer the user inputs to be processed with low sensitivity, a second user might prefer the user inputs be processed with moderate sensitivity, and a third user might prefer the user inputs to be processed with high sensitivity. In another example, a user input might be provided to the portable electronic device while primarily stationary on a surface, such as a desktop or table. Here, lower sensitivity can be appropriate since, there is less likely to have other movements that are unrelated to the user input to be characterized. In still another example, a user input might be provided to the portable electronic device while not primarily stationary, such as while being placed on a user lap, while walking, while standing, etc. Here, high sensitivity can be appropriate since there is likely to be various other movement imposed on the portable electronic device that are not intended to be user inputs. Thus, the high sensitivity can act as a filtering of those movements that are not intended to be user inputs. Besides sensitivity, the movements that are not intended to be user inputs can be filtered through processing that can model user inputs with respect to multiple attributes.

Figure 5:
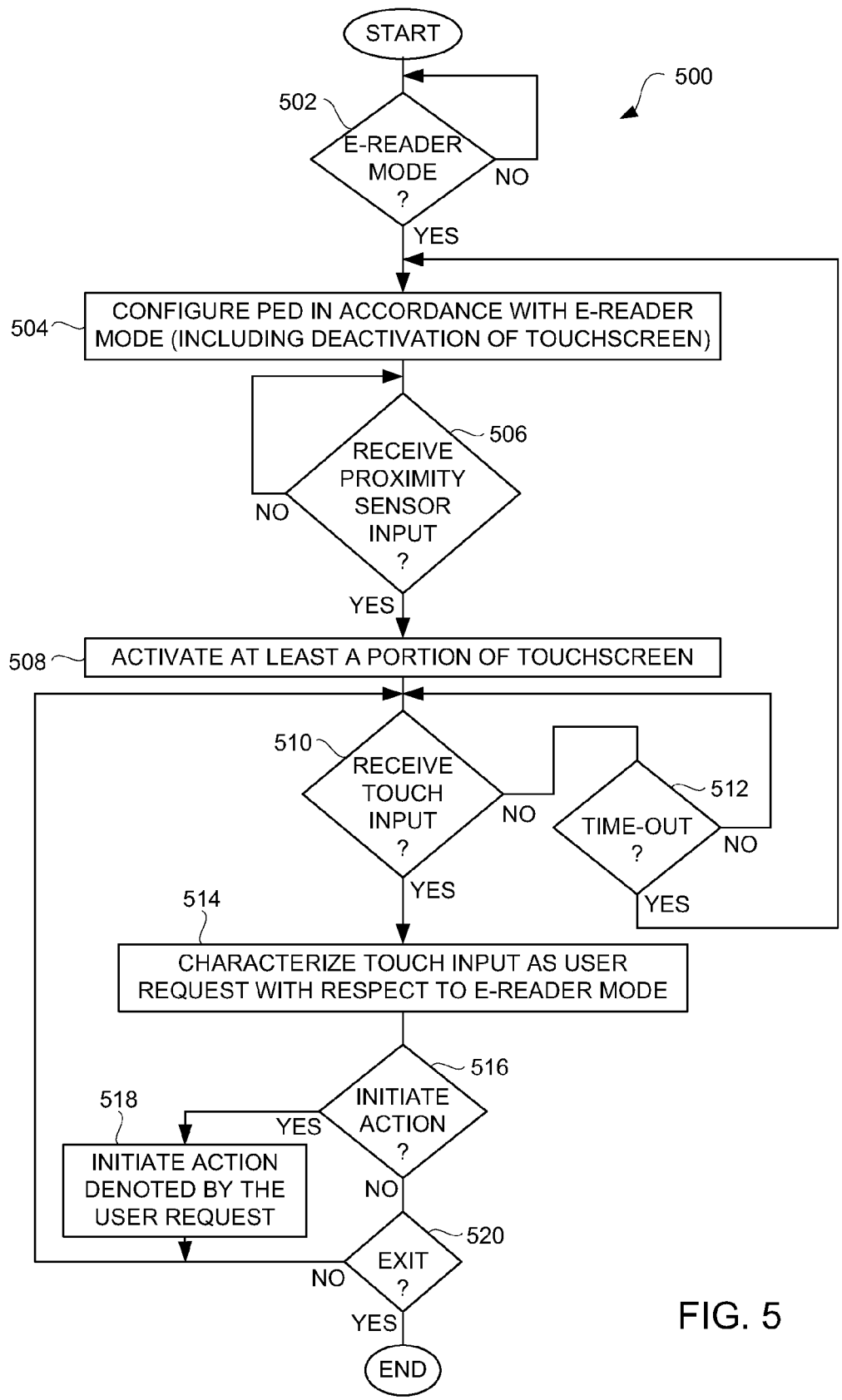
FIG. 5 is a flow diagram of an e-reader control process according to one embodiment of the invention.

FIG. 5 is a flow diagram of e-reader control process 500 according to one embodiment. E-reader control process 500 can, for example, be performed by a portable electronic device, such as the portable electronic device illustrated in FIG. 1.

The e-reader control process 500 can begin with decision 502 that determines whether the portable electronic device is in an e-reader mode. When decision 502 determines that the portable electronic device is not an e-reader mode, e-reader control process 500 can wait until the portable electronic device is in the e-reader mode. In other words, e-reader control process 500 is effectively performed only when the portable electronic device is in the e-reader mode.

Once decision 502 determines that the portable electronic device is in the e-reader mode, the portable electronic device can be configured 504 in accordance with the e-reader mode. Configuration 504 of the portable electronic in accordance with the e-reader mode can include deactivation of at least a portion of the touch-sensitive surface associated with the portable electronic device. Deactivation of at least a portion of the touch surface can conserve power, but does not necessarily impact operation of the display.

Decision 506 can determine whether a proximity sensor input has been received from a proximity sensor provided with the portable electronic device. The proximity sensor can signal an impending user input, such as an impending user input with respect to a touchscreen. Hence, in one embodiment, the proximity associated with the proximity sensor refers to proximity with respect to the touchscreen. The proximity sensor can, for example, be implemented by one more optical sensors, capacitive sensors, ultrasonic sensors, radiation sensors (e.g., thermal), or image sensors (e.g., cameras).

When decision 506 determines that a proximity sensor input has not yet been received, e-reader control process 500 can await such an input. Once decision 506 determines that a proximity sensor input has been received (i.e., impending user input sensed), at least a portion of the touchscreen can be activated 508. Hence, the touchscreen of the portable electronic device is able to be deactivated unless and until the proximity sensor detects an input, in which case, at least a portion of the touchscreen can be activated (at least for a period of time). The activated portion of the touchscreen can be used to received touch inputs such as touch gestures, soft buttons selections, or menu selections (e.g., from a displayed menu).

The at least a portion of the touchscreen being activated 508 can be a defined portion (i.e., limited portion) of the touchscreen which can be referred to as a "hot spot". Alternatively, if the touchscreen does not support partial activation, the entire touchscreen can be activated, though in some cases the activation can be in a mode that has reduced power consumption (e.g., low touch resolution mode). For example, a touchscreen typically has a high resolution to support user inputs, which can include gestures. In one implementation, a touchscreen has a plurality of sensors (e.g., capacitive, resistive, optical, acoustic sensors) and to constantly monitor or scan these sensors for user input can consume significant power. Accordingly, in one embodiment, to reduce the amount of power consumed (as well as processing load), a reduced number of the sensors can be monitored. In other words, when monitoring or scanning for user input, a subset can be initially monitored or scanned (i.e., low resolution scanning) with a reduced power consumption burden. If a user input is detected, the monitoring or scanning can operate to quickly initiate monitoring or scanning all of the sensors for high resolution scanning. Subsequently, when no user input is found, the monitoring or scanning can return to monitoring or scanning only the subset of the sensors. Besides the sensors for the touchscreen, other sensors that might also be used for evaluating user input can be also selectively disabled in certain situations so as to reduce power consumption. An initial user input can, however, cause activation of some such other sensors (e.g., accelerometer, pressure, digital compass, gyroscope, etc.) so that user input can be also evaluated using information from such other sensors.

Also, one or more sensors, such as proximity sensors, can be used. For example, decision 506 can operate to receive a proximity sensor input from a plurality of proximity sensors. With a plurality of sensors, the sensors can be used separately or in combination. For example, a plurality of proximity sensors can be used to determine a portion of a touchscreen to be activated. As another example, a plurality of sensors can be used to identify user inputs, particularly those user inputs that are associated with a particular mode of operation (e.g., user requests next page while in e-reader mode).

Additional information on touchscreens or touch sensing can, for example, be found in: U.S. Pat. No. 7,495,659; U.S. Patent Application No. 2006/0032680A1; and U.S. patent application Ser. No. 12/140,923, filed Jun. 17, 2008 and entitled "Capacitive Sensor Panel Having Dynamically Reconfigurable Sensor Size and Shape"; and each of which is hereby incorporated herein by reference in its entirety.

After at least a portion of the touchscreen has been activated 508 in response to the proximity sensor input, decision 510 can determine whether a touch input has been received with respect to the touchscreen. When decision 510 determines that a touch input has not been received, decision 512 can determine whether a time-has occurred (i.e., predetermined period of no user input). When decision 512 determines that a time-out has occurred, e-reader control process 500 can return to repeat block 504 and subsequent blocks. Alternatively, when decision 512 determines that a time—has not occurred, control process 500 can return to repeat decision 510 to continue to await a touch input.

Once decision 510 determines that a touch input has been received, the touch input can be characterized 514 as a user request with respect to the e-reader mode. Depending upon the nature of the touch input, a particular user request can be distinguished and identified as a user request being made by the touch input. After the touch input has been characterized 514, decision 516 can determine whether an action is to be initiated in response to the touch input that has been characterized. When decision 516 determines that an action is to be initiated, an action denoted by the user request cannot be initiated 518. The action can pertain to a request (e.g., command, function) for the portable electronic device operating in an e-reader mode. For example, the action might be a next page request, a previous page request, a launch dictionary request, a close e-book request, go to page request, etc. Alternatively, when decision 516 determines that an action is not to be initiated, decision 520 can determine whether control process 500 is to exit (i.e., end). When decision 520 determines that control process 500 is not to exit, as well as following block 518, control process 500 can return to repeat decision 510 so that additional touch inputs can be received. On the other hand, when decision 520 determines that control process 500 is to exit, control process 500 can end.

As noted above, if decision 506 determines that a proximity sensor input has been received, at least a portion of the touchscreen can be activated 508. In one embodiment, not every proximity sensor input can lead to activation 508 of at least a portion of the touchscreen. For example, the proximity sensor input may be required to correspond to particular gestures before activation 508 occurs. As another example, the proximity sensor input may be required to correspond to a user's finger.

The mode dependent user interface controls described herein are, for example, suitable for portable electronic devices. Some examples of portable electronic devices include mobile telephones (e.g., cell phones), Personal Digital Assistants (PDAs), portable media players (e.g., MP3 players), remote controllers, notebook computers, netbook computers, electronic tablets (including tablet computers), e-book readers, portable gaming devices (including game players and game controllers), etc.

The various aspects, features, embodiments or implementations described above can be used alone or in various combinations.

The many features and advantages of embodiments of the invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for controlling a portable electronic device having a display with a plurality of sensors, said method comprising:
    determining whether the portable electronic device is in an e-reader mode;
    configuring the portable electronic device in accordance with the e-reader mode when said determining determines that the portable electronic device is in the e-reader mode, wherein configuring the portable electronic device in accordance with the e-reader mode comprises:
    deactivating a portion of a touch-sensitive surface of the display while the display is active;
    activating the portion of the touch-sensitive surface of the display in a low touch resolution mode in response to a user interface input, wherein activating the portion of the touch-sensitive surface in the low touch resolution mode comprises scanning only a subset of the plurality of sensors for a touch input, wherein the subset of the plurality of sensors is located across the portion of the touch-sensitive surface of the display;
    in response to receiving a touch input, transitioning the portion of the touch-sensitive surface from the low touch resolution to a high touch resolution mode to activate the portion of the touch-sensitive surface in the high touch resolution mode, wherein activating the portion of the touch-sensitive surface in the high touch resolution mode comprises scanning all of the plurality of sensors across the portion of the touch-sensitive surface of the display for an additional user interface input;
    characterizing the additional user interface input at the activated portion of the touch-sensitive surface of the display as a user request with respect to the e-reader mode;
    determining whether an action at the portable electronic device is to be initiated based on the user request;
    initiating the action denoted by the user request if said determining determines that the action at the portable electronic device is to be initiated; and
    in response to determining the portable electronic device is not in e-reader mode, characterizing the additional user interface input received at the activated portion of the touch-sensitive surface of the display as an input different than a user request in e-reader mode.

2. The method as recited in claim 1, wherein said characterizing is dependent on the mode of the portable electronic device.

3. A method for controlling a portable electronic device having a touchscreen and at least one proximity sensor, wherein the touchscreen includes a display having a touch-sensitive surface and a plurality of sensors, said method comprising:
    determining whether the portable electronic device is in an e-reader mode;
    configuring the portable electronic device in accordance with the e-reader mode when said determining determines that the portable electronic device is in the e-reader mode, said configuring including at least deactivating a portion of the touch-sensitive surface of the display while activating the display;
    determining whether a proximity sensor input is received from the at least one proximity sensor;
    activating the portion of the touch-sensitive surface in a low touch resolution mode in response to determining that the proximity sensor input is received, wherein activating the portion of the touch-sensitive surface in the low touch resolution mode comprises scanning only a subset of the plurality of sensors for a touch input, wherein the subset of the plurality of sensors are located across the portion of the touch-sensitive surface the display;
    determining whether the touch input is received via the touch-sensitive surface;
    in response to determining that the touch input has been received, transitioning the portion of the touch-sensitive surface from the low touch resolution mode to a high touch resolution mode to activate the portion of the touch-sensitive surface in the high touch resolution mode, wherein activating the portion of the touch-sensitive surface in the high touch resolution mode comprises scanning all of the plurality of sensors across the portion of the touch-sensitive surface of the display for an additional user interface input;
    characterizing the additional user interface input as a user request with respect to the e-reader mode;

determining whether an action at the portable electronic device is to be initiated based on the user request;

initiating the action denoted by the user request if said determining determines that the action at the portable electronic device is to be initiated; and in response to determining the portable electronic device is not in e-reader mode, characterizing the additional user interface input received via the touch-sensitive surface as an input different than a user request in e-reader mode.

4. A portable electronic device, comprising:

a display screen;

a user input device configured to receive a user input on a portion of the display screen, wherein the display screen comprises a touch-sensitive surface with a plurality of sensors;

a configuration manager to configure the display screen of the portable electronic device to operate in an e-reader mode and in at least one other mode, wherein configuring the display to operate in e-reader mode comprises:

deactivating a portion of a touch-sensitive surface of the display while the display is active:

activating the portion of the touch-sensitive surface in a low touch resolution mode while the display is operating in the e-reader mode in response to a user interface input, wherein activating the portion of the touch-sensitive surface in the low touch resolution mode comprises scanning only a subset of the plurality of sensors for a user input, wherein the subset of the plurality of sensors are located across the portion of the touch-sensitive surface the display;

determining whether the user input has been received via the touch-sensitive surface; and in response to determining that the user input has been received, transitioning the portion of the touch-sensitive surface from the low touch resolution mode to a high touch resolution mode to activate the portion of the touch-sensitive surface in the high touch resolution mode, wherein activating the portion of the touch-sensitive surface in the high touch resolution mode comprises scanning all of the plurality of sensors across the portion of the touch-sensitive surface of the display for an additional user input; and a processor configured to execute instructions that operate to evaluate the additional user input that has been received on the portion of the touch-sensitive surface of the display screen in accordance with the e-reader mode if determined that the portable electronic device is in the e- reader mode, and to evaluate the additional user input that has been received on the portion of the touch-sensitive surface of the display screen in accordance with the at least one other mode if determined that the portable electronic device is not in the e-reader mode.

5. The portable electronic device as recited in claim 4, wherein the additional user interface input is provided as a tap on the portable electronic device.

6. The portable electronic device as recited in claim 4, wherein said portable electronic device comprises:

a plurality of sensors operatively coupled to the processor, the sensors being used to determine if the portable electronic device is in the e-reader mode.

7. The portable electronic device as recited in claim 4, wherein the user input device is selected from the group consisting of a button, a key, a touchscreen, and a sensor.

8. The portable electronic device as recited in claim 4, wherein said method further comprises:

activating another user input device if the detected additional user input requests such activation.

9. The portable electronic device as recited in claim 8, wherein the another user input device is a touchscreen or a touch surface.

* * * * *